3,499,851
WASTE COFFEE GROUNDS AS A FILLER IN THERMOSETTING MATERIALS
Eugenie Ligo, 38 Calcraft House, Bonner Road, London, E 2, England
No Drawing. Filed Oct. 4, 1967, Ser. No. 672,740
Claims priority, application Great Britain, Oct. 6, 1966, 44,615/66; Dec. 23, 1966, 57,744/66; Feb. 16, 1967, 7,440/67
Int. Cl. C08g 5/18
U.S. Cl. 260—17.2
8 Claims

ABSTRACT OF THE DISCLOSURE

The present invention is concerned with plastic materials and articles made therefrom, characterised by the presence of waste coffee grounds as a filler.

BACKGROUND OF THE INVENTION

It has been generally recognized for a number of years that although resinous materials, be they of the thermosetting or thermoplastic type, are extremely versatile, they do not necessarily always fulfil all requirements. Consequently, inert materials acting as modifying agents are incorporated into the resins in order to improve or alter the basic properties thereof. Such materials, which may be of organic or inorganic nature, are generally referred to as "fillers." Typical examples include wood flour, paper, asbestos, mica, slate, glass and clays.

Apart from the specific property which the filler is to impart to the plastic material, it is obvious that it must also be readily available, be as cheap as possible and be of good quality.

In addition to fillers of the type defined above, it is frequently necessary or desirable to improve or alter the properties of plastic materials by the addition thereto of a lubricant, as in the case of, for example, moulding materials. The material and its lubricant must be compatible because if a non-compatible lubricant is used, it is likely to sweat out of the moulded article as a bloom, thus giving a poor surface finish. Consequently, it is important to find new lubricants capable of producing a surface finish which is free from bloom.

It can also be a matter of great importance to obtain an improved surface finish on a moulding, as is the case with wood-filled phenolic moulding materials, for example, when required for certain applications. Various mineral fillers, such as slate, flour or talc, can be used to obtain a good surface finish but all of these materials have a relatively high specific gravity, thus preventing their general use. They are also non-fibrous in nature and thus impart very little reinforcement to the resin, resulting in mouldings of low mechanical strength. Coconut shell flour has been widely used for this purpose but this material is comparatively expensive and the hazard of bloom is not entirely eliminated due to the use of stearic acid as a lubricant in such mouldings.

Although a large variety of fillers are already known and used in connection with plastic materials, there is always a need for a fresh source of fillers at a greatly reduced cost which are readily available, especially when such new fillers combine several desirable characteristics and are capable of emulating the performance of other fillers in current use.

Since World War II, there has been a constantly increasing production throughout the world of soluble coffee i.e. so-called instant coffee, coffee extracts and the like. This has resulted in the availability of very large quantities of spent coffee grounds remaining after the removal of the soluble matter from ground coffee beans. So far, this denatured and exhausted material, which has been subjected to such drastic treatments as hydrolysis and pyrolysis, in addition to removal of all of its water-soluble matter, has found no useful application other than burning in instant coffee manufacturers' furnaces to reduce fuel costs.

SUMMARY OF THE INVENTION

I have now found that spent coffee grounds are outstandingly useful as a versatile filler for various types of plastic materials, especially thermosetting moulding materials, the products obtained being as good as or even better than those obtained with the use of conventional fillers. Spent coffee grounds can be successfully employed as a general-purpose reinforcing filler in most cases where wood flour has previously been used, including linoleum and the like, provided that the dark colour is no objection.

DETAILED DESCRIPTION OF THE INVENTION

It is, of course, to be understood that for most purposes the spent coffee grounds will be too coarse for use as a filler so that, before use, it is normally necessary for the spent grounds to be ground to a flour. As in the case of the production of wood flour for filling purposes, the spent coffee grounds are preferably converted into flour by one of the known methods, for example by grinding or pounding in a hammer mill. The preferred particle size should be sufficiently small to enable the spent coffee grounds to pass through a 100 mesh screen.

As is known, coffee beans have quite a high oil content; the major proportion of this oil still remains behind in the spent coffee grounds even after extraction of the water-solubles by the most efficient methods, including hydrolysis. Since the quantity of the oil has been only slightly reduced, whereas the total quantity of coffee grounds has been greatly reduced as a result of expression of the water-soluble matter, the content of oil in spent coffee grounds is actually substantially higher than in coffee berries. One sample of instant coffee residues was found to contain as much as 26.66% of coffee oil (as extractable by petroleum ether).

According to one feature of the present invention, spent coffee grounds are used as a filler for plastic materials and at the same time function as a lubricant, due to the oil content therein. However, in this case it is to be understood that it is usually necessary also to use a conventional type of filler since the oil content will normally be too high to permit a satisfactory product to be obtained with the use of such oil-containing spent coffee grounds as the sole filler.

According to another feature of the present invention, the spent coffee grounds are subjected to an oil extraction process, in known manner, preferably by a solvent extraction method using an organic solvent, for which the percolator column method is particularly suited since it leaves only a fraction of 1% by weight coffee oil in the stripped grounds. When substantially all of the oil has been removed, the resultant de-oiled spent coffee grounds can be used as the sole filler for plastic materials.

The extracted coffee oil can be utilised and it represents a valuable by-product, which may play an important part in the economics of processing the spent coffee grounds to the required standards for use as a filler.

However, as already indicated above, it is frequently desirable or necessary to add a lubricant to a plastic material. Therefore, according to a further feature of the present invention, the oil content of the spent coffee grounds is reduced by organic solvent extraction to about 1.0–2.0% by weight and this material can then also be used as the sole filler, fulfilling at the same time the role of lubricant.

It is understood that the spent coffee grounds to be used according to the present invention, whether de-oiled or not, should preferably be dried before use to a water content of not more than 10% by weight. Furthermore, to prevent any possible fermentation or bacterial action taking place, it is preferred to add a small amount of a preservative, for example about 0.5% of formaldehyde in the form of a dilute aqueous solution, to the spent coffee grounds if they are not to be used immediately as fillers, this being particularly desirable when the spent grounds are to be stored, prior to use, with a high moisture content. The presence of this formaldehyde can also have a beneficial effect in those cases where the resin used is one based on formaldehyde and another material, such as phenol or urea.

Due to the fact that a considerable amount of material has been removed from the coffee grounds during the extraction thereof, the waste coffee grounds to be used according to the present invention contain a large number of hollow cavities and interstices in the basic fibrous structure of the material and this has the advantage of imparting an improved resilience or elasticity to the plastic products containing waste coffee grounds as a filler.

The following examples are given for the purpose of illustrating the present invention:

EXAMPLE 1

This example illustrates the use of spent coffee grounds as a general-purpose reinforcing filler, particularly as a replacement for wood flour.

Spent coffee grounds were dried to a 7.5% by weight moisture content, solvent-extracted to a residual oil content of 1% by weight and then ground and passed through a 100 mesh screen. 100 parts of a phenol-formaldehyde resin were then combined with 100 parts of the spent coffee flour as a filler and mouldings were prepared in the usual way.

The above procedure was repeated, with the exception that 160 parts of spent coffee flour were combined with 100 parts of the resin.

In both cases, the important physical characteristics of the resulting mouldings were determined and compared with those of equivalent wood flour-filled and coconut-filled products. It was found that the spent-coffee-filled mouldings had an outstandingly good surface finish, far superior to that of the wood-filled mouldings and as good as, or even slightly better than, that of the coconut-filled article. The electrical insulation of the spent-coffee-filled material was found to be comparable with that of the wood-filled plastic. As can be seen from the relevant data given hereunder, spent coffee acts as a more efficient extender than coconut-shell flour and its moulding powder has a greater flowability; it also has a greater flowability than wood flour-filled moulding powder. It will be noticed that no stearic acid was incorporated in the spent-coffee filled moulding powders, this filler acting as a self-contained lubricant.

| | | | | |
|---|---|---|---|---|
| Phenolic resin | 100 | 100 | 100 | 100 |
| Wood flour | 100 | | | |
| Coconut-shell flour | | | | 140 |
| Spent coffee grounds | | 100 | 160 | |
| Stearic acid | 3 | | | 2.5 |
| Plus dyestuff, accelerator etc | 20 | 20 | 18 | 18 |
| Cup flow, secs | 10 | 10 | 10 | 9 |
| Flowability, cms | 15.5 | 17 | 15.5 | 14.75 |
| Hardness | 22 | 26 | 28 | 20 |
| Shrinkage, thou./in | 9.5 | 10.2 | 11.0 | 11.2 |
| Impact, ft. lbs | 0.170 | 0.150 | 0.160 | 0.187 |
| Tensile, lbs./sq. in | 8,000 | 7,500 | 6,900 | 7,100 |
| Crossbreaking, lbs./sq. in | 11,500 | 11,200 | 12,400 | 13,600 |

EXAMPLE 2

This example illustrates the use of spent coffee grounds in combination with other fillers, particularly as a replacement for the much more expensive coconut-shell flour.

80 parts of spent coffee flour as used in Example 1 were mixed with 50 parts of wood-flour and the mixture was combined with 100 parts of phenol-formaldehyde resin, whereupon mouldings were produced in the usual way. The important physical characteristics were then determined and compared with those of equivalent coconut-filled material.

Milling was good and the surface finish of the spent-coffee moulding was found to be free of bloom and slightly better than that of the coconut-filled material, possibly due to the reduced amount of stearic acid used. From the data given below it can be seen that the results obtained with the use of waste coffee grounds compare very well with those obtained with the use of coconut-shell flour.

| | | |
|---|---|---|
| Phenolic resin | 100 | 100 |
| Wood flour | 50 | 50 |
| Coconut-shell flour | | 80 |
| Spent coffee grounds | 80 | |
| Stearic acid | 1 | 2.5 |
| Plus dyestuff, accelerator etc | 20 | 20 |
| Cup flow, secs | 10 | 10 |
| Flowability, cms | 16.5 | 16 |
| Hardness | 25 | 22 |
| Shrinkage, thou./in | 10.1 | 10.6 |
| Impact, ft. lbs | 0.153 | 0.190 |
| Tensile, lbs./sq. in | 7,000 | 7,300 |
| Crossbreaking, lbs./sq. in | 11,500 | 13,200 |

EXAMPLE 3

This example illustrates the use of spent coffee grounds as a lubricant, in place of stearic acid, in thermo-setting moulding powders.

1.5% by weight, based on resin content, of spent coffee grounds as used in Example 1 but with a 22.8% by weight oil content (as extractable with petroleum ether), were incorporated in a wood-coconut filled phenol-formaldehyde moulding powder to replace the 1.5% by weight of stearic acid normally used as a lubricant. The resulting mouldings proved to be satisfactory, without a trace of surface bloom.

The above procedure was repeated using 3% by weight of spent coffee grounds instead of 1.5% by weight. Here, too, a satisfactory moulding was obtained, with a bloom-free surface finish.

1.5% and 3% by weight, respectively, of spent coffee grounds as above were incorporated in a wood-filled urea-formaldehyde thermosetting powder as a replacement for stearic acid, normally used as a lubricant. The mouldings obtained therefrom were satisfactory and showed an improved surface finish free from bloom.

I claim:

1. A thermosetting synthetic organic resin composition comprising dried, pulverized and substantially de-oiled waste coffee grounds as a filler.

2. A composition according to claim 1 wherein the oil content of the waste coffee grounds is about 1.0 to 2.0% by weight.

3. A composition according to claim 1 wherein at least one other filler is additionally present therein.

4. A composition according to claim 3 wherein the filler other than the waste coffee grounds is wood flour.

5. A composition according to claim 1 wherein the thermosetting resin is a phenolic resin.

6. A composition according to claim 1 wherein the thermosetting resin is an aldehyde resin.

7. A composition according to claim 1 in which the thermosetting resin is phenol-formaldehyde.

8. A composition according to claim 1 wherein the waste coffee grounds are, before being used as a filler, ground to a flour, the particles of which pass through a 100 mesh screen.

References Cited

UNITED STATES PATENTS

| | | | |
|---|---|---|---|
| 2,376,607 | 5/1945 | Lum et al. | 260—17.2 |
| 2,577,521 | 12/1951 | Harvey | 260—17.2 |

OTHER REFERENCES

Chem. Abst. 50: 11717h, (Marcandalli), Plastic Composition, 1956.

Chem. Abst. 44: 11125c, (Gernert), Production of Oil From Coffee Grounds, 1950.

Chem. Abst. 41: 619e, (Osório), Cafelite, the Plastic Material From Coffee, 1946.

Chem. Abst. 64: 4173d, (Barbera), Utilization of Coffee Residue, 1965.

WILLIAM H. SHORT, Primary Examiner

E. WOODBERRY, Assistant Examiner

U.S. Cl. X.R.

106—288; 260—38, 17.3